United States Patent
Hermann

(10) Patent No.: US 11,613,266 B2
(45) Date of Patent: Mar. 28, 2023

(54) MONITORING A COMPONENT OF A CONTROL SYSTEM FOR A MEANS OF TRANSPORT

(71) Applicant: Elektrobit Automotive GmbH, Erlangen (DE)

(72) Inventor: Stefan Hermann, Frankfurt am Main (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 116 days.

(21) Appl. No.: 17/222,184

(22) Filed: Apr. 5, 2021

(65) Prior Publication Data
US 2021/0309239 A1 Oct. 7, 2021

(30) Foreign Application Priority Data
Apr. 7, 2020 (EP) .................................. 20168511

(51) Int. Cl.
*B60W 50/04* (2006.01)

(52) U.S. Cl.
CPC ..... *B60W 50/045* (2013.01); *B60W 2050/041* (2013.01)

(58) Field of Classification Search
CPC ........... B60W 50/045; B60W 2050/041; G06F 11/0739; G06F 11/0757; G06F 11/3668; G06F 11/0793; G06F 11/0796
See application file for complete search history.

(56) References Cited

U.S. PATENT DOCUMENTS

| | | | |
|---|---|---|---|
| 7,194,372 B2 * | 3/2007 | Carver | G06F 11/263 |
| | | | 714/E11.177 |
| 9,090,265 B2 | 7/2015 | Yousuf | |
| 9,576,137 B2 | 2/2017 | Habel et al. | |
| 9,725,054 B2 | 8/2017 | Rupp et al. | |
| 2010/0066526 A1 | 3/2010 | Kascha | |
| 2015/0033357 A1 | 1/2015 | Habel et al. | |
| 2016/0313715 A1 | 10/2016 | Fischer et al. | |
| 2019/0121359 A1 | 4/2019 | Dobberphul et al. | |

FOREIGN PATENT DOCUMENTS

| | | | | |
|---|---|---|---|---|
| DE | 102009011430 A1 | 8/2010 | | |
| DE | 102012024818 A1 | 9/2013 | | |
| DE | 102013216444 A1 | 3/2014 | | |
| DE | 10 2014 222860 A1 * | 6/2015 | .......... | B60W 50/029 |

(Continued)

OTHER PUBLICATIONS

European Search Report for European Application No. 20168511.2, dated Sep. 28, 2020, 12 pages.

(Continued)

*Primary Examiner* — Brian P Sweeney
(74) *Attorney, Agent, or Firm* — RatnerPrestia

(57) ABSTRACT

A method to a computer program containing instructions and to a module for monitoring a component of a control system for a transport. In a first step, a function call is sent to the component to execute a function used by the component using defined input data. Then a response from the component to the function call is received. The response is subsequently compared with an expected response. Finally, an action is performed in response to a result of the comparison.

11 Claims, 5 Drawing Sheets

(56) References Cited

FOREIGN PATENT DOCUMENTS

| | | |
|---|---|---|
| DE | 102014222860 A1 | 6/2015 |
| DE | 102015207317 A1 | 10/2016 |
| EP | 2823430 B1 | 11/2018 |
| WO | 2015028581 A1 | 3/2015 |

OTHER PUBLICATIONS

Autosar Elektrobit downloaded from https://www.elektrobit.com/products/ecu/technologies/autosar, 2019, 4 pages.
Autosar Enabling Innovation, downloaded from https://www.autosar.org, 2019, 4 pages.

* cited by examiner

MONITORING A COMPONENT OF A CONTROL SYSTEM FOR A MEANS OF TRANSPORT

CROSS REFERENCE TO RELATED APPLICATIONS

This application claims priority to European Patent Application No. 20168511, filed Apr. 7, 2020, the contents of such application being incorporated by reference herein.

FIELD OF THE INVENTION

The present invention relates to a method, to a computer program containing instructions and to a module for monitoring a component of a control system for a means of transport.

BACKGROUND OF THE INVENTION

A major aspect in the development of control systems for means of transport, in particular in the automotive sector, is the handling of malfunctions or failures of these systems. Since such situations can have critical repercussions, an essential safely objective is to handle these situations reliably. Functions for detecting failure of a digital system are usually referred to as a watchdog. If a watchdog detects a possible malfunction of a component, then this is signaled to another component, for instance by switching to a redundant system, or alternatively a reset is triggered to clear the fault or a safe shutdown is initiated.

In a conventional simple watchdog approach, for instance in which a defined bit is set in response to an external request, only the input/output functions of a component are monitored. Even the more recent watchdog approaches based on challenge response methods monitor only functions of an arithmetic logic unit (ALU) and the input/output functions. It is not sufficient, however, to monitor just these functions if the functional safety of applications is meant to comply with ASIL B (ASIL: Automotive Safety Integrity Level) or ASIL D, or the functional safety of an operating system is meant to comply with ASIL B.

In this context, DE 10 2012 024 818 A1, incorporated herein by reference, describes a method for improving the functional safety and increasing the availability of an electronic motor-vehicle control system comprising hardware and software components, where the hardware components are abstracted by a basic software component or a runtime environment. An implemented safety concept defines two or more software layers, where a first software layer comprises application-software control functions, and a second software layer is designed as a function monitor for protecting against errors in the control functions. In the method, data encryption or a data signature provided by a hardware component is used for data protection of a communication channel of the hardware component to a first software component.

SUMMARY OF THE INVENTION

An aspect of the present invention provides solutions for improved monitoring of a component of a control system for a means of transport.

According to a first aspect of the invention, a method for monitoring a component of a control system for a means of transport comprises the steps:

sending a function call to the component to execute a function used by the component using defined input data;

receiving a response from the component to the function call;

comparing the response with an expected response; and performing an action in response to a result of the comparison.

According to a further aspect of the invention, a computer program comprises instructions that, when executed by a computer, cause the computer to carry out the following steps for monitoring a component of a control system for a means of transport:

sending a function call to the component to execute a function used by the component using defined input data;

receiving a response from the component to the function call;

comparing the response with an expected response; and performing an action in response to a result of the comparison.

The term computer should be understood in the broad sense in this case. In particular, it also includes control units, controllers, embedded systems and other processor-based data processing devices.

The computer program can be provided for electronic retrieval or may be stored on a computer-readable storage medium, for example.

According to a further aspect of the invention, a module for monitoring a component of a control system for a means of transport comprises:

a communication module for sending a function call to the component to execute a function used by the component using defined input data, and for receiving a response from the component to the function call;

a comparison module for comparing the response with an expected response; and an action module for performing an action in response to a result of the comparison.

In the solution according to an aspect of the invention, a module arranged external to the monitored component calls a defined function of the component using defined input data, and compares the result with an expected result. If there is a discrepancy between the result and the expected result, the module can instigate appropriate measures. The called function is a function that is also executed during normal operation of the component, for instance end-to-end (E2E) communication protection, cryptographic protection, object recognition, etc. Management of the system health is thereby achieved at a significantly higher safety level, which is ASIL-D compliant. The greater complexity required to do this is negligible.

According to one aspect of the invention, a counter is increased or a reset of the component is initiated in response to a difference between the response and the expected response, or a counter is reduced if there is a match between the response and the expected response. A watchdog implementation routinely uses counters which are decremented and, on reaching zero, supply an internal failure signal. This approach can be applied to the solution according to an aspect of the invention by decrementing a counter in the event of there being no match. This avoids triggering a reset immediately on a difference occurring for the first time. Alternatively, a forced reset of the component can obviously take place when a difference first occurs.

According to one aspect of the invention, the function and the defined input data are retrieved from a list containing functions and input data. Which functions and input data are held in the list can be determined, for instance, as part of the software development. Adjustments to suit updated software of the component can be made easily by updating the list. In addition, monitoring for newly added components can also be provided in this manner.

According to one aspect of the invention, the function and the defined input data are represented by identifiers. By using identifiers, for instance identification numbers, it is possible to reduce the data volume between the watchdog and the control system, or the monitored component. The functions and input data to be used are held for this purpose preferably in a shared memory.

According to one aspect of the invention, sending the function call to the component, selecting the function or selecting the defined input data is performed on a random basis. Improved detection of malfunctions is achieved by randomly sending and randomly selecting the function and/or the input data.

According to one aspect of the invention, a response delay is evaluated when comparing the response with the expected response. The query takes place in a time window, which can depend on the function. A malfunction can be inferred if a response is not received within the time window.

According to one aspect of the invention, the component is application software, a container, a hypervisor or an operating system. Using the solution according to an aspect of the invention, it is possible to monitor all the components of a control system for a means of transport that execute functions. The operating system is preferably checked in this case indirectly, for instance checked for functions or threads, to prevent the queries from interfering with the functionality.

A method according to an aspect of the invention or a module according to an aspect of the invention is preferably used in a means of transport, for instance in a motor vehicle. The means of transport may also be, however, a manned or unmanned aircraft, for instance a drone or a flying taxi, etc. The module can be implemented, for example, in a safety core of a high-performance controller, or external to the high-performance controller.

Further features of aspects of the present invention will become apparent from the description that follows and the appended claims in conjunction with the figures.

BRIEF DESCRIPTION OF THE DRAWINGS

Overview of the figures

DETAILED DESCRIPTION OF THE PREFERRED EMBODIMENTS

For a better understanding of the principles of an aspect of the present invention, embodiments of the invention will be described below in more detail with reference to the figures. The same reference signs are used in the figures for identical or functionally identical elements and are not necessarily described again for each figure. It is obvious that an aspect of the invention is not restricted to the illustrated embodiments and that the described features may also be combined or modified without departing from the scope of protection of the invention as defined in the accompanying claims.

Figure 1:
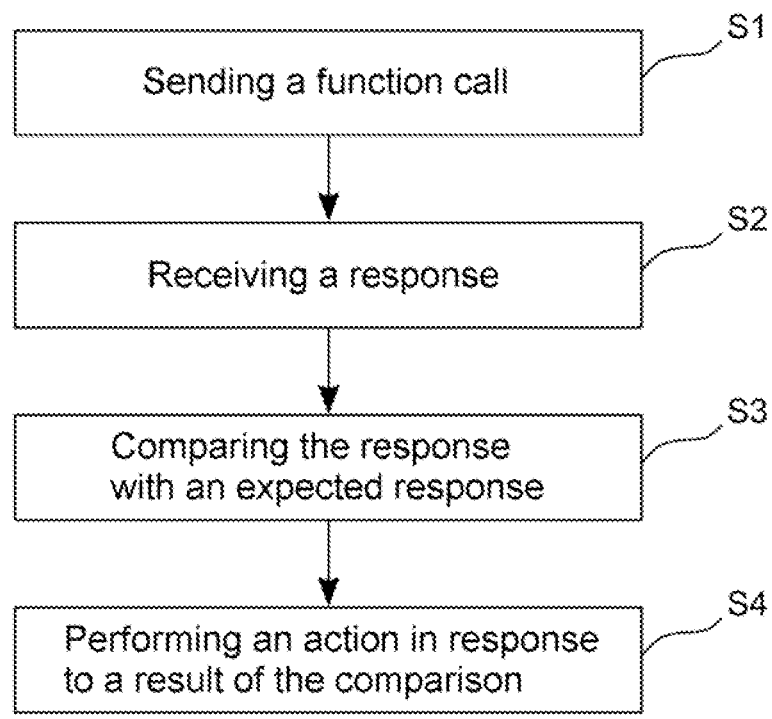
FIG. 1 shows schematically a method for monitoring a component of a control system for a means of transport.

FIG. 1 shows schematically a method for monitoring a component of a control system for a means of transport. For example, the component may be application software, a container, a hypervisor or an operating system. In a first step, a function call is sent S1 to the component to execute a function used by the component using defined input data. For instance, the function and the defined input data can be retrieved from a list containing functions and input data, and can be represented by identifiers. The sending S1 of the function call to the component, selecting the function or selecting the defined input data is preferably performed on a random basis. Then a response from the component to the function call is received S2. The response is subsequently compared S3 with an expected response. A response delay can also be evaluated in the process. Finally, an action is performed S4 in response to a result of the comparison S3. For example, a counter can be increased or a reset of the component can be initiated in response to a difference between the response and the expected response. On the other hand, a counter can be reduced if there is a match between the response and the expected response.

Figure 2:
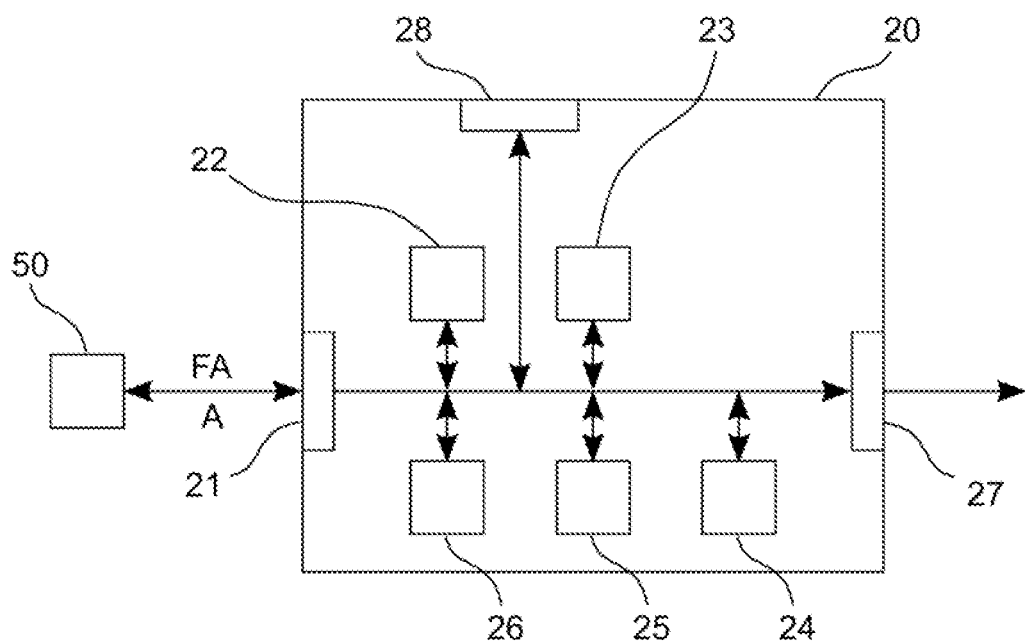
FIG. 2 shows schematically a first embodiment of a module for monitoring a component of a control system for a means of transport.

FIG. 2 shows a simplified schematic diagram of a first embodiment of a module 20 for monitoring a component of a control system 50 for a means of transport. For example, the component may be application software, a container, a hypervisor or an operating system. The module 20 has an interface 21, via which a communication module 22 can send a function call FA to the component of the control system 50 to execute a function used by the component using defined input data. For instance, the function and the defined input data can be retrieved from a list containing functions and input data, and can be represented by identifiers. The sending of the function call FA to the component, selecting the function or selecting the defined input data is preferably performed on a random basis. The module 20 can also receive via the interface 21 a response A from the component to the function call FA. A comparison module 23 then compares the response A with an expected response. The comparison module 23 can also evaluate a response delay in the process. Finally, an action module 24 performs an action in response to a result of the comparison. For example, a counter can be increased or a reset of the component can be initiated in response to a difference between the response A and the expected response. On the other hand, a counter can be reduced if there is a match between the response A and the expected response. Control commands resulting from the action performed by the action module 24 can be output via an output 27 of the module 20, for instance to the control system 50.

The communication module 22, the comparison module 23 and the action module 24 can be controlled by a control module 25. If applicable, settings of the communication module 22, of the comparison module 23, of the action module 24 or of the control module 25 may be changed via a user interface 28. The data that is generated in the device 20 may be stored, if necessary, in a memory 26 of the device 20, for example for later evaluation or for use by the components of the device 20. The communication module 22, the comparison module 23, the action module 24 and the control module 25 may be implemented as dedicated hardware, for example as integrated circuits. They may of course however also be implemented partly or fully in combination or as software that runs on a suitable processor, for example on a GPU or a CPU. The interface 21 and the output 27 may be implemented as separate interfaces or as a combined interface.

Figure 3:
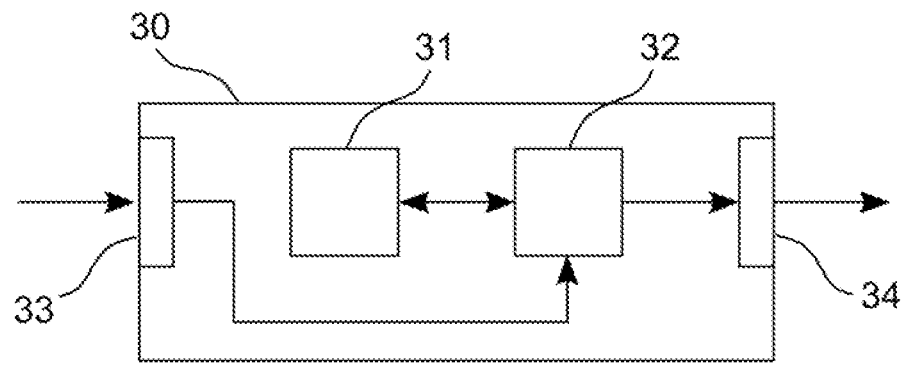
FIG. 3 shows schematically a second embodiment of a module for monitoring a component of a control system for a means of transport.

FIG. 3 shows a simplified schematic diagram of a second embodiment of a module 30 for monitoring a component of a control system for a means of transport. The module 30 comprises a processor 32 and a memory 31. The module 30 is a controller, for example. The memory 31 stores instructions that, when executed by the processor 32, prompt the module 30 to carry out the steps according to one of the described methods. The instructions stored in the memory 31 thus embody a program that is able to be executed by the processor 32 and that performs the method according to an aspect of the invention. The module 30 has an input 33 for receiving information from a component of a control system. Data generated by the processor 32 is provided via an output 34. This data may also be stored in the memory 31. The input 33 and the output 34 may be combined to form a bidirectional interface.

The processor 32 can comprise one or more processor units, for example microprocessors, digital signal processors or combinations thereof.

The memories 26, 31 of the described apparatuses may contain both volatile and non-volatile memory areas and may comprise a wide variety of storage devices and storage media, for example hard disks, optical storage media or semiconductor memories.

Figure 4:
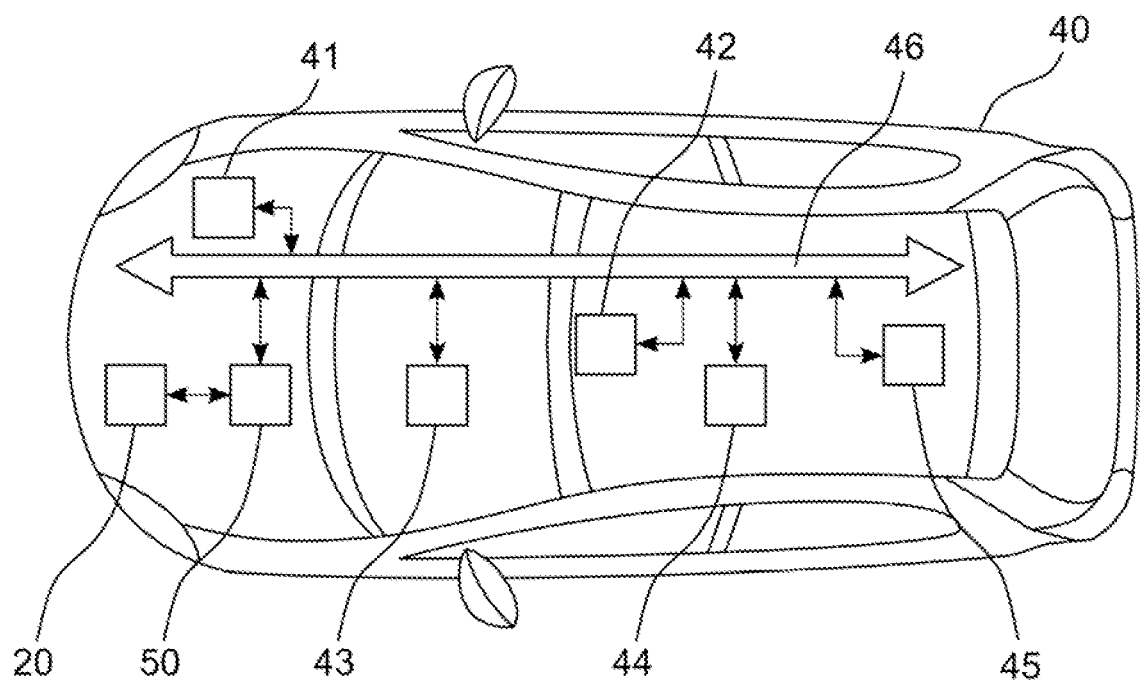
FIG. 4 shows schematically a means of transport in which a solution according to an aspect of the invention is implemented.

FIG. 4 shows schematically a means of transport 40 in which a solution according to an aspect of the invention is implemented. The means of transport 40 is a motor vehicle in this example. The motor vehicle comprises at least one assistance system 41, which assists a user of the motor vehicle during driving. A sensor system 42 can be used to acquire data on the vehicle surroundings or on the vehicle movement. In particular, the sensor system 42 can comprise environment-detection sensors, for instance ultrasound sensors, laser scanners, radar sensors, lidar sensors or cameras, and sensors for determining relative movements, for instance sensors for odometry, gyroscopes or accelerometers. A control system 50 is used to control components and/or functions of the motor vehicle. A module 20 monitors at least one component of the control system 50 in order to detect failures of the component and to instigate appropriate measures if necessary. The module 20 can obviously also be integrated in the control system 50. In this example, further elements of the motor vehicle are a navigation system 43 and a data transfer unit 44. A connection to a back-end, for instance for receiving updated software for the components of the motor vehicle, can be established by means of the data transfer unit 44. A memory 45 is present for storing data. Data is exchanged between the various components of the motor vehicle via a network 46.

Figure 5:
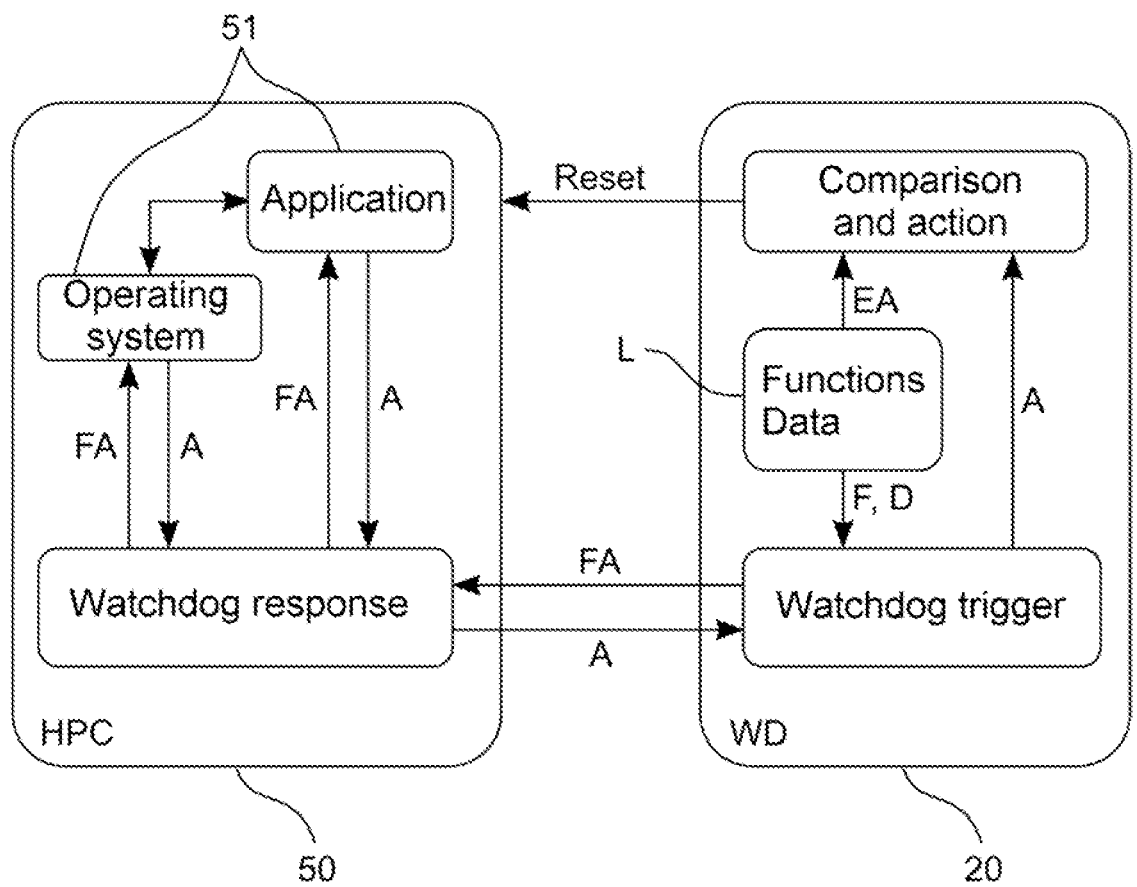
FIG. 5 shows schematically a system diagram of a solution according to an aspect of the invention.

FIG. 5 shows schematically a system diagram of a solution according to an aspect of the invention. The system comprises two components: a challenge component and a response component. The challenge component is implemented in the monitoring module 20, or watchdog WD. The response component, on the other hand, is implemented in the control system 50, or high-performance controller HPC.

The challenge component triggers at preferably random times a challenge to the response component, and for this purpose sends a function call FA to this component. The function call FA comprises identifiers for a function F to be executed and the input data D to be processed. Alternatively, it is also possible for the entire input data to be transferred. The function F to be executed and the associated input data D can be obtained, for instance, from a list L which contains functions and data and also contains the associated expected response.

The response component receives the function call FA and causes the component 51 that is to be monitored to execute the desired function F using the associated input data D, for instance by calling the relevant function F of an operating system or of an application. The function or the corresponding file may be held in an application container. The response A resulting from processing the input data D is then transferred from the response component to the challenge component.

The challenge component receives the response A and evaluates it by comparing the response A with the expected response EA. This process can also involve evaluating the response time. If the evaluation does not match expectations, a signal to reset the component 51 is sent to the control system 50.

For example, the data transfer can proceed in the following way. First the challenge component triggers the response component. The input data to be used is stored for this purpose in a variable VAR0 in a shared memory. The expected response is stored in a first output variable VAR1. The desired function is then called using VAR0 as the input datum. The result of the function is stored in a second output variable VAR2. The results in the two output variables VAR1 and VAR2 are evaluated by the challenge component.

Figure 6:
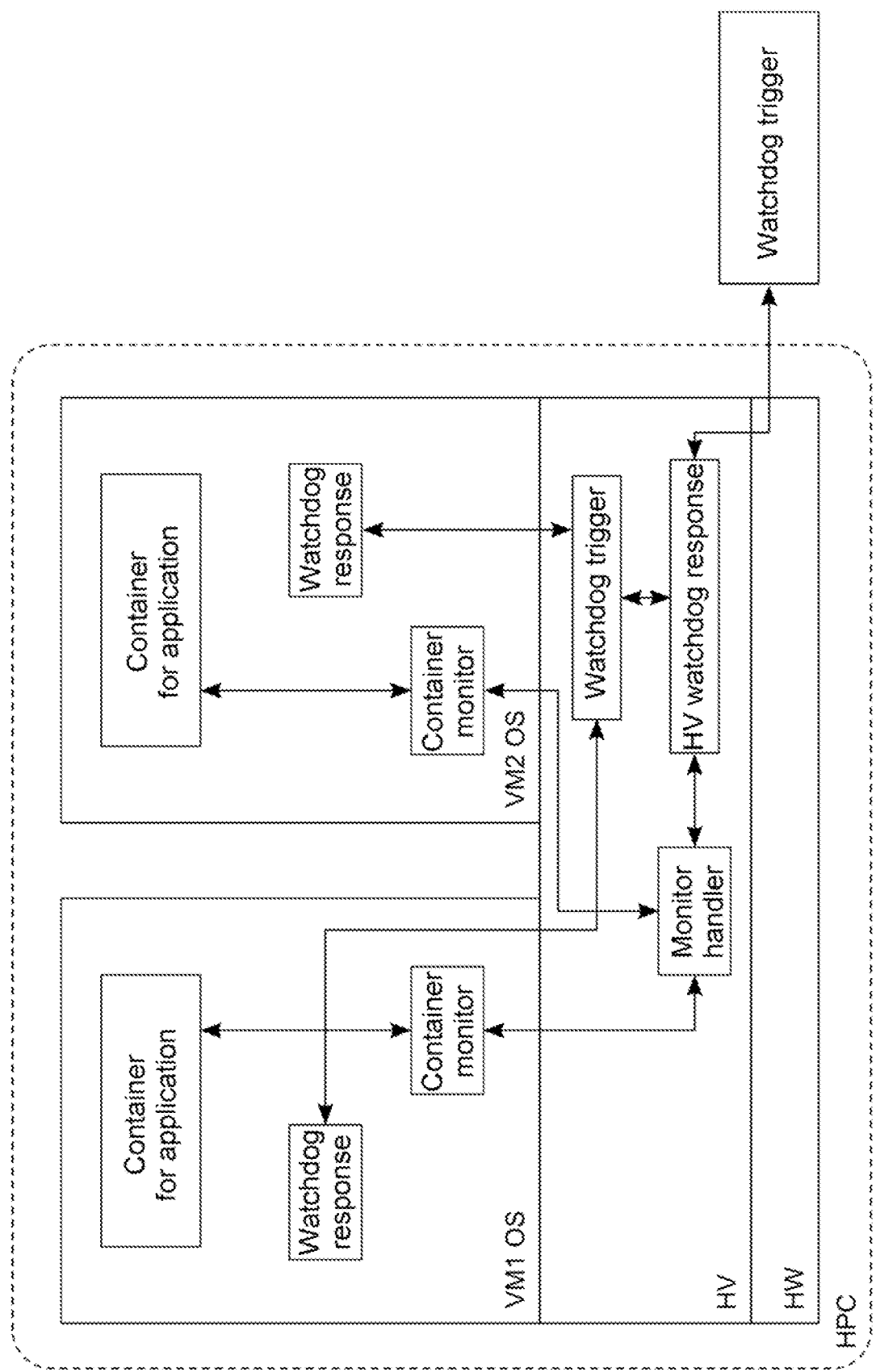
FIG. 6 shows schematically a first embodiment of a solution according to an aspect of the invention for a high-performance computer of a motor vehicle.

FIG. 6 shows schematically a first embodiment of a solution according to the invention for a high-performance controller HPC of a motor vehicle. In the example shown, the central control unit of a motor vehicle works with software from Elektrobit [2] based on the AUTOSAR architecture [1] and contains a high-performance controller, which consists of a combination of a plurality of multi-core processors. These processors are divided into performance cores and safety cores, which are not shown explicitly in FIG. 6. A plurality of performance partitions, in which CPU-intensive vehicle and user functions are executed, run on the performance cores. A safety partition, in which safety functions are executed, runs on the safety cores. A hypervisor HV, i.e. a virtualization environment, can run on the performance partitions. The hypervisor provides virtual machines VM1, VM2 having associated operating systems OS, in which applications run in containers. The containers isolate the applications from the operating system and other applications. The containers are each monitored by a container monitor, which can be used to check the utilization of the container, detect bottlenecks and investigate errors. The container monitors are themselves monitored by a monitor handler in the hypervisor HV. This involves a process that monitors interactions and collects data for reporting. In this process, a monitor handler manipulates or modifies objects in the system in a non-active manner.

The main components of the high-performance controller HPC are a RISC processor, hardware HW for the performance partitions and the safety partition, and a graphics processing unit, which is not shown in FIG. 6. Classic AUTOSAR, developed in accordance with ASIL B, is typically used on the safety partition. The performance partitions typically use Adaptive AUTOSAR, which is developed to ASIL A or lower. One of the main features of Adaptive AUTOSAR is the capability to update individual functions retrospectively and at runtime. Unlike classic AUTOSAR, this can be done without replacing and rebooting the entire control-unit software. If ASIL-B compliant safety applications are running on an adaptive operating system, the safety partition must monitor the health condition of the performance partition in accordance with ASIL B. In addition, an external component that is ASIL-D compliant must monitor the health condition of the classic operating system of the safety partition. These requirements can only be achieved if the coverage of the health monitoring is at least 90%.

Since most of the functions of the operating system OS use only some of the processing resources, for instance RISC functions, RAM or the stack, the watchdog uses more functions of the operating system OS, for instance object recognition based on artificial intelligence. Monitoring is performed primarily on functions of the operating system OS that are used by applications, but not on unused functions and resources of the operating system OS. The function calls including input data and output data can be stored with identification numbers in a non-volatile memory. The watchdog then uses only the identification numbers in order to reduce the data transfer required for the monitoring.

Figure 7:
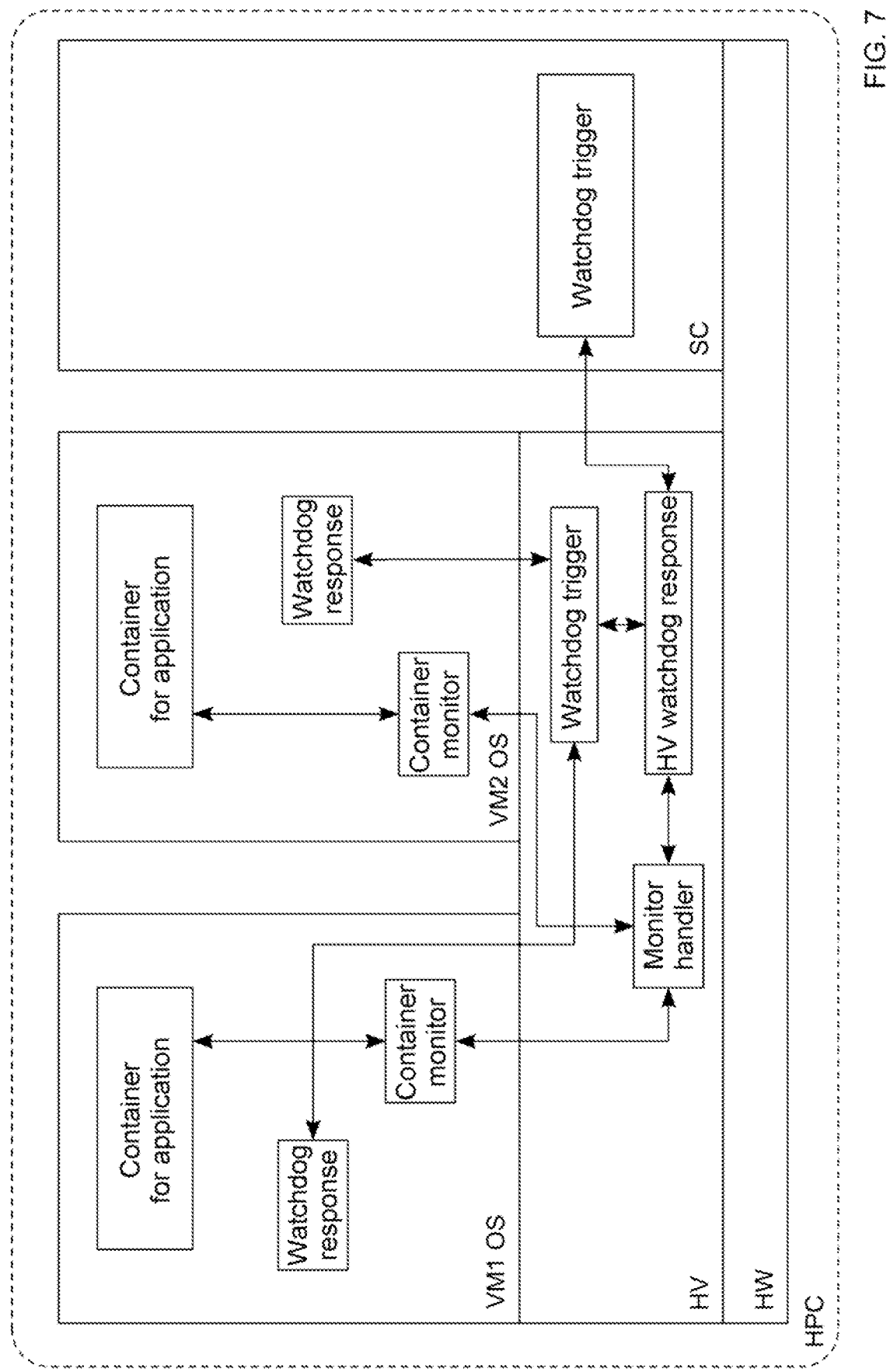
FIG. 7 shows schematically a second embodiment of a solution according to an aspect of the invention for a high-performance computer of a motor vehicle.

FIG. 7 shows schematically a second embodiment of a solution according to the invention for a high-performance controller HPC of a motor vehicle. The embodiment largely corresponds to the embodiment already shown in FIG. 6. In this case, however, the watchdog is implemented in a safety core SC which runs on the hardware HW of the high-performance computer HPC.

REFERENCES

[1] https://www.autosar.org/
[2] https://www.elektrobit.com/products/ecu/technologies/autosar/
The aforementioned references are incorporated herein.

The invention claimed is:

1. A method for monitoring a component of a control system for a means of transport, comprising:
    sending a function call to the component to execute a function used by the component using defined input data;
    receiving a response from the component to the function call;
    comparing the response with an expected response; and
    performing an action in response to a result of the comparison,
    wherein the defined input data is represented by an input data identifier.

2. The method as claimed in claim 1, wherein a counter is increased or a reset of the component is initiated in response to a difference between the response and the expected response, or a counter is reduced if there is a match between the response and the expected response.

3. The method as claimed in claim 2, wherein the function and the defined input data are retrieved from a list containing functions and input data.

4. The method as claimed in claim 1, wherein the function and the defined input data are retrieved from a list containing functions and input data.

5. The method as claimed in claim 1, wherein the function is represented by a function identifiers.

6. The method as claimed in claim 1, wherein sending the function call to the component, selecting the function or selecting the defined input data is performed on a random basis.

7. The method as claimed in claim 1, wherein a response delay is evaluated when comparing the response with the expected response.

8. The method as claimed in claim 1, wherein the component is application software, a container, a hypervisor or an operating system.

9. A non-transitory computer program containing instructions which, when executed by a computer, cause the computer to execute a method for monitoring a component of a control system for a means of transport, the method comprising:
    sending a function call to the component to execute a function used by the component using defined input data;
    receiving a response from the component to the function call;
    comparing the response with an expected response; and
    performing an action in response to a result of the comparison,
    wherein the defined input data is represented by an input data identifier.

10. A controller for monitoring a component of a control system for a means of transport, comprising:
    a communication module for sending a function call to the component to execute a function used by the component using defined input data, and for receiving a response from the component to the function call;
    a comparison module for comparing the response with an expected response; and
    an action module for performing an action in response to a result of the comparison,
    wherein the defined input data is represented by an input data identifier.

11. The controller as claimed in claim 10, wherein the controller is implemented in a safety core of a high-performance controller or is implemented external to the high-performance controller.

* * * * *